(12) United States Patent
Tsuji

(10) Patent No.: US 12,197,774 B2
(45) Date of Patent: Jan. 14, 2025

(54) SEMICONDUCTOR DEVICE AND CONTROL METHOD

(71) Applicant: Kioxia Corporation, Tokyo (JP)

(72) Inventor: Nobuhiro Tsuji, Yokohama Kanagawa (JP)

(73) Assignee: KIOXIA CORPORATION, Tokyo (JP)

(*) Notice: Subject to any disclaimer, the term of this patent is extended or adjusted under 35 U.S.C. 154(b) by 42 days.

(21) Appl. No.: 17/899,833

(22) Filed: Aug. 31, 2022

(65) Prior Publication Data
US 2023/0195371 A1     Jun. 22, 2023

(30) Foreign Application Priority Data
Dec. 20, 2021 (JP) .................... 2021-205982

(51) Int. Cl.
G06F 3/06 (2006.01)

(52) U.S. Cl.
CPC .......... *G06F 3/0656* (2013.01); *G06F 3/0604* (2013.01); *G06F 3/0659* (2013.01); *G06F 3/0679* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 8,055,816 B2    11/2011  Asnaashari et al.
8,738,866 B2    5/2014   Sonoda et al.
(Continued)

FOREIGN PATENT DOCUMENTS

JP    2000-187637 A    7/2000
JP    2006-195990 A    7/2006
(Continued)

OTHER PUBLICATIONS

Understanding Flash: Blocks, Pages and Program / Erases; flashdba; Jun. 20, 2014; retrieved from https://flashdba.com/2014/06/20/understanding-flash-blocks-pages-and-program-erases/ on May 14, 2024 (Year: 2014).*

(Continued)

*Primary Examiner* — Daniel C. Chappell
(74) *Attorney, Agent, or Firm* — Foley & Lardner LLP

(57) ABSTRACT

According to one embodiment, there is provided a semiconductor device including a first chip, a second chip group having a plurality of second chips electrically connected to the first chip, and a third chip group having a plurality of third chips electrically connected to the first chip in parallel with the second chip group, in which the first chip has a command queue that stores a plurality of read commands received from the host, and a read buffer memory that buffers read data, sequentially issues the plurality of read commands stored in the command queue to the second chip group or the third chip group, stores the read data corresponding to the plurality of read commands from the second chip group or the third chip group, in the read buffer memory, and transmits any read data among the read data stored in the read buffer memory to the host based on an execution status of any read command among the plurality of read commands.

18 Claims, 16 Drawing Sheets

(58) Field of Classification Search
CPC .............. G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | |
|---|---|---|---|
| 9,639,280 B2* | 5/2017 | Roberts | G06F 3/0611 |
| 10,009,156 B2* | 6/2018 | Kanodia | H04L 47/2408 |
| 10,073,643 B2 | 9/2018 | Jung et al. | |
| 10,983,700 B2 | 4/2021 | Wang | |
| 11,106,390 B1 | 8/2021 | Goss et al. | |
| 11,175,859 B1* | 11/2021 | La Fratta | G06F 3/0659 |
| 11,907,575 B2* | 2/2024 | Yoon | G06F 13/1673 |
| 2006/0152981 A1 | 7/2006 | Ryu | |
| 2007/0277184 A1* | 11/2007 | Yasuda | G11B 20/10527 |
| 2010/0064297 A1* | 3/2010 | Doll | H04L 12/403 |
| | | | 719/315 |
| 2011/0047356 A2 | 2/2011 | Flynn et al. | |
| 2011/0130848 A1* | 6/2011 | Tegnell | H04L 12/40032 |
| | | | 700/3 |
| 2014/0129206 A1* | 5/2014 | Cheng | G06F 30/33 |
| | | | 703/24 |
| 2015/0067450 A1* | 3/2015 | Ryu | G06F 3/0619 |
| | | | 714/773 |
| 2015/0143062 A1 | 5/2015 | Tsuboi et al. | |
| 2017/0357581 A1 | 12/2017 | Yanagidaira et al. | |
| 2018/0268906 A1 | 9/2018 | Shimura et al. | |
| 2019/0303019 A1 | 10/2019 | Sunata et al. | |
| 2019/0362761 A1 | 11/2019 | Sato et al. | |
| 2020/0089430 A1* | 3/2020 | Kanno | G06F 3/0659 |
| 2020/0387425 A1 | 12/2020 | Igahara et al. | |
| 2021/0271415 A1 | 9/2021 | Fitzpatrick et al. | |
| 2021/0294521 A1 | 9/2021 | Suzuki | |
| 2022/0415424 A1* | 12/2022 | Papandreou | G11C 29/42 |
| 2024/0036736 A1* | 2/2024 | Anderson | G06F 3/0673 |

FOREIGN PATENT DOCUMENTS

| | | |
|---|---|---|
| JP | 2015-099570 A | 5/2015 |
| JP | 2016-212580 A | 12/2016 |
| JP | 2018-156708 A | 10/2018 |
| JP | 2019-179455 A | 10/2019 |
| JP | 2019-204565 A | 11/2019 |
| JP | 2020-050570 A | 4/2020 |
| JP | 2020-198577 A | 12/2020 |
| JP | 2021-149729 A | 9/2021 |
| WO | WO-2016/143009 A1 | 9/2016 |

OTHER PUBLICATIONS

N. S. Aswathy et al., "A Soft Real-time Memory Request Scheduler for Phase Change Memory Systems," 2021 IEEE 27th International Conference on Embedded and Real-Time Computing Systems and Applications (RTCSA), Houston, TX, USA, Aug. 18-20, 2021, pp. 109-118, doi: 10.1109/RTCSA52859.2021.00021. (Year: 2021).*
Y. Lee and S. Kim, "RAMS: DRAM Rank-Aware Memory Scheduling for Energy Saving," in IEEE Transactions on Computers, vol. 65, No. 10, pp. 3210-3216, Oct. 1, 2016, doi: 10.1109/TC.2016.2525994. (Year: 2016).*
A. Puri et al., "Understanding the Performance Impact of Queue-Based Resource Allocation in Scalable Disaggregated Memory Systems," 2023 IEEE 16th International Symposium on Embedded Multicore/Many-core Systems-on-Chip (MCSoC), Singapore, 2023, pp. 317-324, doi: 10.1109/MCSoC60832.2023.00054. (Year: 2023).*
W. Liu et al., "LAMS: A latency-aware memory scheduling policy for modern DRAM systems," 2016 IEEE 35th International Performance Computing and Communications Conference (IPCCC), Las Vegas, NV, USA, 2016, pp. 1-8, doi: 10.1109/PCCC .2016.7820660. (Year: 2016).*

* cited by examiner

FIG. 15A

|   | 7 | 6 | 5 | 4 | 3 | 2 | 1 | 0 |
|---|---|---|---|---|---|---|---|---|
| PL0 | PL0 WP | PL0 Cache Busy | PL0 True Busy | PL0 — | PL0 SLC P/F | PL0 SLC P/F | PL0 MLC P/F | PL0 MLC P/F |
| PL1 | PL1 WP | PL1 Cache Busy | PL1 True Busy | PL1 — | PL1 SLC P/F | PL1 SLC P/F | PL1 MLC P/F | PL1 MLC P/F |
| PL2 | PL2 WP | PL2 Cache Busy | PL2 True Busy | PL2 — | PL2 SLC P/F | PL2 SLC P/F | PL2 MLC P/F | PL2 MLC P/F |
| PL3 | PL3 WP | PL3 Cache Busy | PL3 True Busy | PL3 — | PL3 SLC P/F | PL3 SLC P/F | PL3 MLC P/F | PL3 MLC P/F |

FIG. 15B

TEMPLATE NUMBER

| No.1 PL0–3 | PL3 Cache Busy | PL3 True Busy | PL2 Cache Busy | PL2 True Busy | PL1 Cache Busy | PL1 True Busy | PL0 Cache Busy | PL0 True Busy |
|---|---|---|---|---|---|---|---|---|
| No.2 PL0–3 | PL3 MLC P/F | PL3 MLC P/F | PL2 MLC P/F | PL2 MLC P/F | PL1 MLC P/F | PL1 MLC P/F | PL0 MLC P/F | PL0 MLC P/F |

| LUN* | WP | Cache Busy | True Busy | – | – | – | N-1 P/F | N P/F |

TEMPLATE NUMBER
No.3

| LUN0 Cache Busy | LUN0 True Busy | LUN4 Cache Busy | LUN4 True Busy | LUN5 Cache Busy | LUN5 True Busy | – | – |

SEMICONDUCTOR DEVICE AND CONTROL METHOD

CROSS-REFERENCE TO RELATED APPLICATION(S)

This application is based upon and claims the benefit of priority from Japanese Patent Application No. 2021-205982, filed Dec. 20, 2021, the entire contents of which are incorporated herein by reference.

FIELD

Embodiments described herein relate generally to a semiconductor device and a control method.

BACKGROUND

In general, a semiconductor device may be connected to a host. The semiconductor device has a plurality of memory chips, and a plurality of channels connected to the plurality of memory chips, respectively. Commands and data targeting the memory chips are transferred between the host and the semiconductor device. It is desired to transfer signals corresponding to the commands and the data between the host and the memory chips at high speed.

DESCRIPTION OF THE DRAWINGS

FIG. 15A is a diagram showing an example of data read by a status read command according to the ninth embodiment.

FIG. 15B is a diagram showing an example of data in which read data according to the ninth embodiment is formatted.

DETAILED DESCRIPTION

Figure 1:
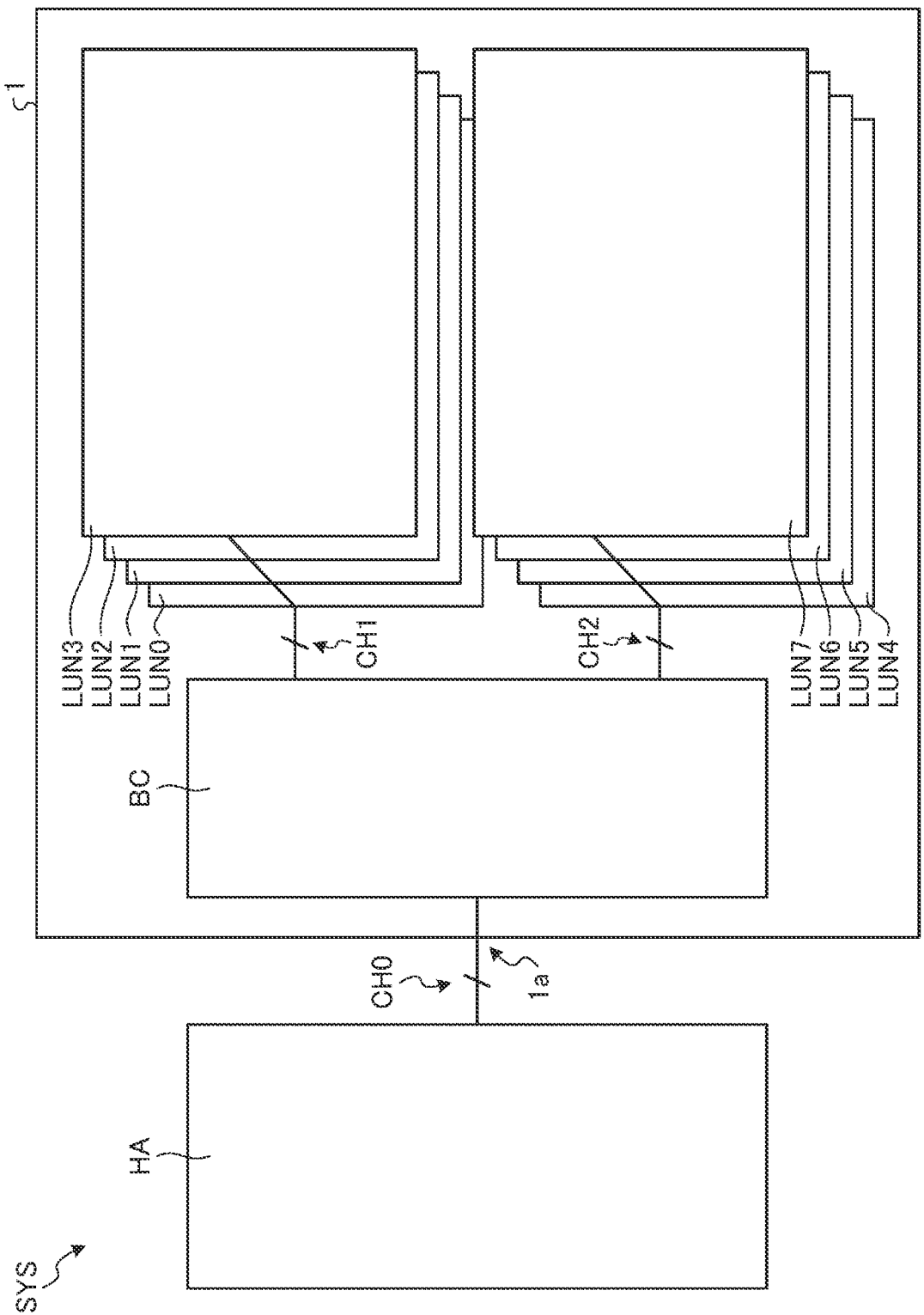
FIG. 1 is a diagram showing a configuration of a storage system to which a semiconductor device according to a first embodiment is applied.

Embodiments provide a semiconductor device that transfers data between a host and memory chips at high speed.

In general, according to one embodiment, there is provided a semiconductor device including a first chip, a second chip group having a plurality of second chips electrically connected to the first chip, and a third chip group having a plurality of third chips electrically connected to the first chip in parallel with the second chip group, in which the first chip has a command queue that stores a plurality of read commands received from the host, and a read buffer memory that buffers read data, sequentially issues the plurality of read commands stored in the command queue to the second chip group or the third chip group, stores the read data corresponding to the plurality of read commands from the second chip group or the third chip group, in the read buffer memory, and transmits any read data among the read data stored in the read buffer memory to the host based on an execution status of any read command among the plurality of read commands.

A semiconductor device according to embodiments will be described in detail with reference to the accompanying drawings. The present disclosure is not limited to the embodiments.

First Embodiment

A semiconductor device according to an embodiment includes an external terminal that may be connected to a host, a bridge chip, and a plurality of chips. The plurality of chips are connected to the external terminal via the bridge chip. The host is connected to the external terminal of the semiconductor device via a wired communication path. In the semiconductor device, access to the plurality of chips from the host via the wired communication path is performed via the bridge chip. The respective chips are memory chips of a non-volatile memory such as a NAND flash memory.

In a case where the respective chips are the memory chips, the number of chips equipped in the semiconductor device is increasing in order to improve a mounting density. For example, the mounting density is improved by stacking the chips. At this time, in order to reduce the load on the connection with each chip and increase the speed, a configuration may be taken in which the bridge chip called a Frequency Boosting Interface (FBI) chip is connected to the external terminal and the bridge chip and the plurality of chips are connected by a plurality of channels. A plurality of chips may be connected to each of the channels. The bandwidth of the wired communication path is equal to the bandwidth of each of the channels and smaller than the total bandwidth of each of the channels. Since one of the plurality of channels is selectively used, the communication speed between the bridge chip and each chip tends to be slow. Therefore, when the semiconductor device receives one command from the host and processes the command for the chip of each channel according to the received command, a waiting time tends to occur at a host side.

Therefore, in the present embodiment, in the semiconductor device, a command queue that may store a plurality of commands is provided so that the commands are executed in parallel to the plurality of channels. As a result, the data transfer speed between the host and the plurality of chips via the bridge chip is improved.

Specifically, a storage system SYS to which a semiconductor device 1 is applied is configured as shown in FIG. 1. FIG. 1 is a diagram showing a configuration of the storage system SYS to which the semiconductor device 1 is applied.

The storage system SYS includes a host HA and the semiconductor device 1. The semiconductor device 1 includes a bridge chip BC and a plurality of chips LUN0 to LUN7. The bridge chip BC is an example of a first chip. The chips LUN0 to LUN3 are examples of a second chip. The chips LUN4 to LUN7 are examples of a third chip. The semiconductor device 1 may be configured as a Multi Chip Package (MCP) in which the chips LUN0 to LUN7 are stacked. When the semiconductor device 1 is configured as the MCP, in the semiconductor device 1, the periphery of the bridge chip BC and the plurality of chips LUN0 to LUN7 may be sealed with a mold resin. FIG. 1 illustrates a configuration in which four chips LUN0 to LUN3 are connected to the bridge chip BC via a channel CH1 and four chips LUN4 to LUN7 are connected to the bridge chip BC via a channel CH2. That is, the semiconductor device 1 may be configured as a multi chip module including the plurality of (here, 8) chips LUN0 to LUN7. The respective chips LUN0 to LUN7 are memory chips of a non-volatile memory such as a NAND flash memory.

The host HA may be a device such as a controller, or may be a processor provided in an electronic device, such as a computer or a mobile terminal, for controlling the semiconductor device 1. The semiconductor device 1 may be connected to the host HA via a wired communication path (for example, a serial bus or the like) CH0. The semiconductor device 1 and the host HA are connected via the wired communication path CH0 configured based on a predetermined standard. When each of the chips LUN0 to LUN7 is a NAND flash memory, the predetermined standard is, for example, a toggle DDR standard or an ONFi standard. For example, the wired communication path CH0 functions as a toggle DDR interface.

The bridge chip BC is electrically connected between an external terminal group 1a and a plurality of (here, 2) channels CH1 and CH2. The external terminal group 1a may be electrically connected to the host HA via the wired communication path CH0. The plurality of chips LUN0 to LUN7 are connected to the bridge chip BC via the plurality of channels CH1 and CH2. The bridge chip BC and each of the chips LUN0 to LUN7 are connected via the channels CH1 and CH2 configured based on a predetermined standard. When each of the chips LUN0 to LUN7 is a NAND flash memory, the predetermined standard is, for example, the toggle DDR standard or the ONFi standard. For example, the channels CH1 and CH2 function as the toggle DDR interface. Further, a chip group CP1 is a chip group including the chips LUN0 to LUN3. A chip group CP2 is a chip group including the chips LUN4 to LUN7. The chip group CP1 is an example of a second chip group. The chip group CP2 is an example of a third chip group.

Figure 2:
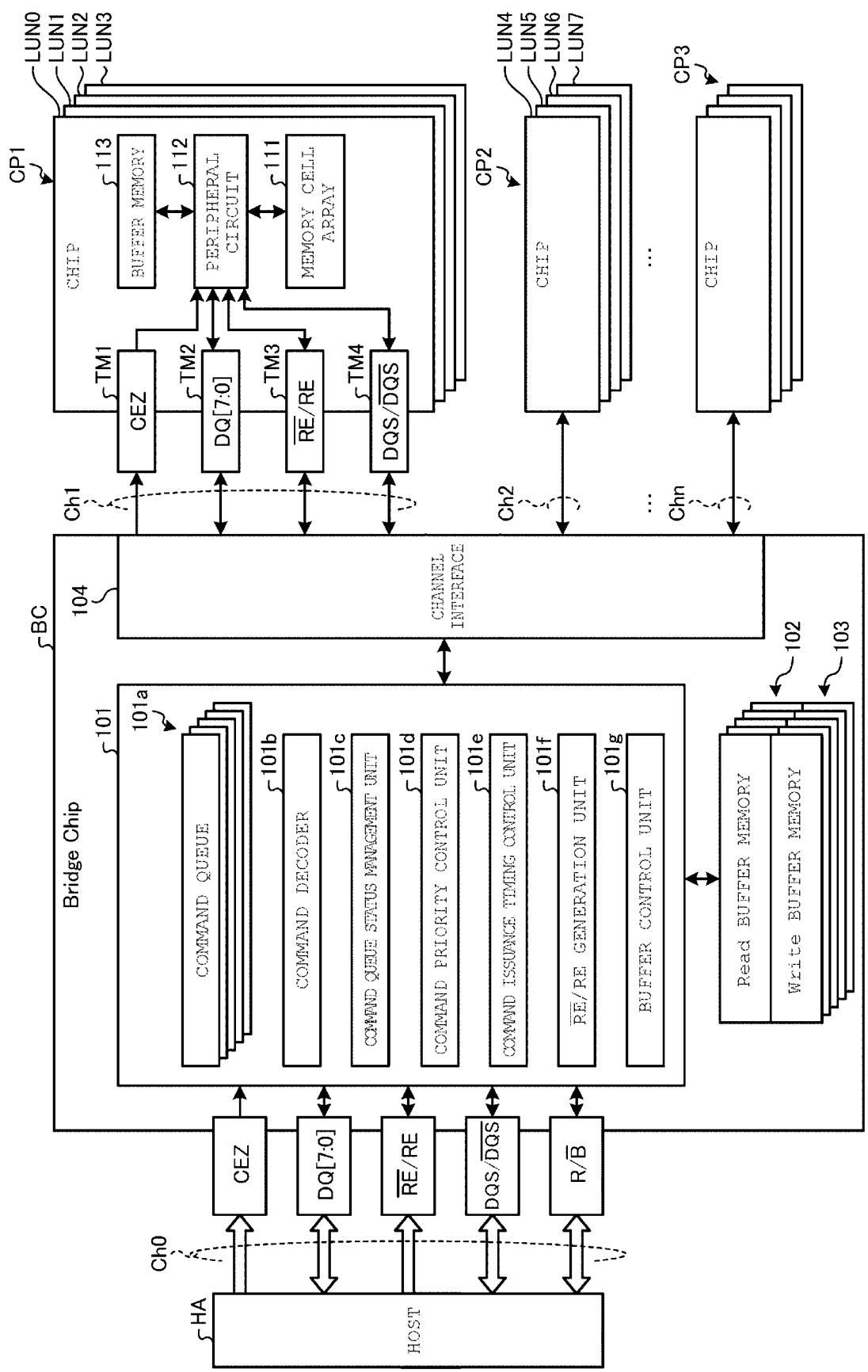
FIG. 2 is a diagram showing a configuration of the semiconductor device according to the first embodiment.

FIG. 2 is a diagram showing a detailed configuration of the semiconductor device 1. For example, as shown in FIG. 2, the external terminal group includes a terminal for a chip enable signal CEZ, a terminal for a data signal DQ[7:0], a terminal for a read enable signal $RE^-/RE$, and a terminal for a data strobe signal $DQS/DQS^-$, and a terminal for an $R/B^-$ signal.

With the increase in required access speed, the semiconductor device 1 may perform operations related to a command in synchronization with double edges of rising and falling of a timing signal for capturing transferred data. The $R/B^-$ signal is a signal indicating whether or not the semiconductor device 1 is accessible. An example of a chip control signal is the chip enable signal CEZ. An example of transferred data is the data signal DQ[7:0]. An example of the timing signal is the data strobe signal $DQS/DQS^-$. The read enable signal RE and the read enable signal RE constitute a pair of differential signals. The data strobe signal DQS and the data strobe signal $DQS^-$ constitute a pair of differential signals. The read enable signal $RE^-/RE$ is the timing signal supplied from the host HA. The data strobe signal $DQS/DQS^-$ is the timing signal which is output to the host HA in response to a request to read data from the host HA. Therefore, the timing signal may include a differential signal.

The bridge chip BC includes a controller 101, a read buffer memory 102, a write buffer memory 103, and a channel interface 104.

The controller 101 is disposed between the channel interface 104 and the external terminal group that including the terminal for the chip enable signal CEZ, the terminal for the data signal DQ[7:0], the terminal for the read enable signal $RE^-/RE$, the terminal for the data strobe signal $DQS/DQS^-$, and the terminal for the R/B signal. The controller 101 uses the read buffer memory 102 and the write buffer memory 103 to control the exchange of information between each of the above-described terminals and the channel interface 104.

The controller 101 includes a command queue 101a, a command decoder 101b, a command queue status management unit 101c, a command priority control unit 101d, a command issuance timing control unit 101e, a $RE^-/RE$ generation unit 101f, and a buffer control unit 101g.

The command queue 101a queues commands (for example, a write command, a read command, and the like) received from the host HA.

The command decoder 101b analyzes the command received from the host HA via the terminal for the data signal DQ[7:0], and issues a command to the chip groups CP1 and CP2 according to the result of the analysis. The issued command is supplied from the channel interface 104 to any of the chip groups CP1 and CP2 via any of the channels CH1 and CH2. For example, the command decoder 101b may receive, as the read command, a data setup command or a data output command from the host HA. The data output command is an example of the read command. The data setup command is a command to instruct to transfer data from the memory cell array 111 to a buffer memory 113 of a target chip LUN provided in the chip groups CP1 and CP2. The data output command is a command to instruct to output data stored in the buffer memory 113 of the target chip LUN provided in the chip groups CP1 and CP2 from the chip group CP1 and CP2. Upon receiving each command from the host HA, the command decoder 101b supplies the corresponding command from the channel interface 104 to any of the chip groups CP1 and CP2 via any of the channels CH1 and CH2. Further, the command decoder 101b executes a decode processing of the write command and an erase command.

The command queue status management unit 101c refers to an execution status of a command stored in the command queue 101a, and transmits information on the execution status of the command to the host HA. Here, the execution status of the command indicates a processing status of read, write, or the like related to the command in the chip LUN0 or the like that issued the command.

The command priority control unit 101d changes an execution order of the command stored in the command queue 101a according to a designation from the host HA.

The command issuance timing control unit 101e controls a timing of instructing the chip groups CP1 and CP2 to process the command.

The RE⁻/RE generation unit 103b autonomously generates the read enable signal RE⁻/RE when the command is the data output command according to the result of the analysis of the command decoder 101b. The generated read enable signal RE⁻/RE is supplied from the channel interface 104 to any of the chip groups CP1 and CP2 via any of the channels CH1 and CH2.

When the controller 101 receives the read enable signal RE⁻/RE from the host HA, the controller 101 generates the data strobe signal DQS/DQS⁻ from the received read enable signal RE⁻/RE and outputs the data strobe signal DQS/DQS⁻ to the host HA.

The buffer control unit 101g controls read or write of data from or to the read buffer memory 102 and the write buffer memory 103.

The read buffer memory 102 stores data which is read from the chip group CP1 or CP2. The read buffer memory 102 may include, for example, an SRAM.

The write buffer memory 103 stores data to be written to the chip group CP1 or CP2. The write buffer memory 103 may include, for example, an SRAM.

The channel interface 104 connects the chip groups CP1 and CP2 via the channels CH1 and CH2. The channel interface 104 transfers commands, addresses, data, and the like supplied from the controller 101 or the write buffer memory 103 to the chip groups CP1 and CP2 via the channels CH1 and CH2, stores data supplied from the chip groups CP1 and CP2 in the read buffer memory 102, or supplies the data to the controller 101.

Each of the chips LUN has terminal groups TM1 to TM4, a memory cell array 111, a peripheral circuit 112, and a buffer memory 113. The terminal groups TM1 to TM4 are electrically connected to the channel interface 104 via one channel CH1. The terminal groups TM1, the terminal groups TM2, the terminal groups TM3, and the terminal groups TM4 of the respective of the plurality of chips LUN0 to LUN3 are electrically connected to each other. The terminal groups TM1 to TM4 are electrically connected to one end of the peripheral circuit 112 and one end of the channel CH1. The other end of the channel CH1 is electrically connected to the channel interface 104.

The terminal group TM1 is a terminal group for the chip enable signal CEZ. The terminal group TM1 includes the number of terminals corresponding to the bit width of the chip enable signal CEZ.

The terminal group TM2 is a terminal group for the data signal DQ[7:0]. The terminal group TM2 includes the number of terminals corresponding to the bit width (for example, 8 bit width) of the data signal DQ[7:0].

The terminal group TM3 is a terminal group for the read enable signal RE⁻/RE. The terminal group TM3 includes the number of terminals corresponding to the bit width of the read enable signal RE⁻/RE.

The terminal group TM4 is a terminal group for the data strobe signal DQS/DQS⁻.

The terminal group TM4 includes the number of terminals corresponding to the bit width of the data strobe signal DQS/DQS⁻.

The memory cell array 111 has a structure in which a plurality of memory cells are arranged two-dimensionally or three-dimensionally. The memory cell array 111 is connected to the peripheral circuit 112. The peripheral circuit 112 is disposed around the memory cell array 111, and is electrically connected to the terminal groups TM1 to TM4, the buffer memory 113, and the memory cell array 111. The peripheral circuit 112 uses the buffer memory 113 in response to a command received from the bridge chip BC via the terminal group TM2 to control an access operation (for example, a read operation and a write operation) to each memory cell of the memory cell array 111.

The buffer memory 113 is an input/output buffer via the terminal groups TM1 to TM4 in each of the chips LUN0 to LUN3 of the chip group CP1, and is also called an input and output data latch or a page buffer. The peripheral circuit 112 temporarily stores the data read from the memory cell array 111 in the buffer memory 113 in response to a read data command received from the bridge chip BC. Therefore, the capacity (or size) of the buffer memory 113 has a data size (for example, 16 [kB]) which is a data read unit in the chip group CP1.

The peripheral circuit 112 supplies the data stored in the buffer memory 113 to the bridge chip BC via the terminal groups TM1 to TM4 and the channel CH1 in response to a data output command received from the bridge chip BC. At this time, the controller 101 of the bridge chip BC temporarily stores the data received from any chip LUN of the chip group CP1 in the read buffer memory 102.

Here, the capacity (or size) of the read buffer memory 102 of the bridge chip BC is an integral multiple (for example, 16×N [kB], N is an any positive integer) of a data size which is a data read unit of the chip group CP1. As a result, the read buffer memory 102 may continuously store the read data when the read data is continuously output from the chip group CP1.

Similarly, the chip LUN of the chip group CP2 connected to the channel CH2 also has the terminal groups TM1 to TM4, the memory cell array 111, the peripheral circuit 112, and the buffer memory 113. Since each configuration is the same as in the chip LUN of the chip group CP1 connected to the channel CH1, the description thereof will not be repeated.

Next, an operation of the semiconductor device 1 will be described with reference to FIG. 3. HOST Ch0 shown in FIG. 3 indicates a signal exchanged between the host HA and the bridge chip BC via the wired communication path CH0. NAND Ch1 shown in FIG. 3 indicates a signal exchanged between the bridge chip BC and the chip group CP1 via the channel CH1. NAND Ch2 shown in FIG. 3 indicates a signal exchanged between the bridge chip BC and the chip group CP2 via the channel CH2.

Figure 3:
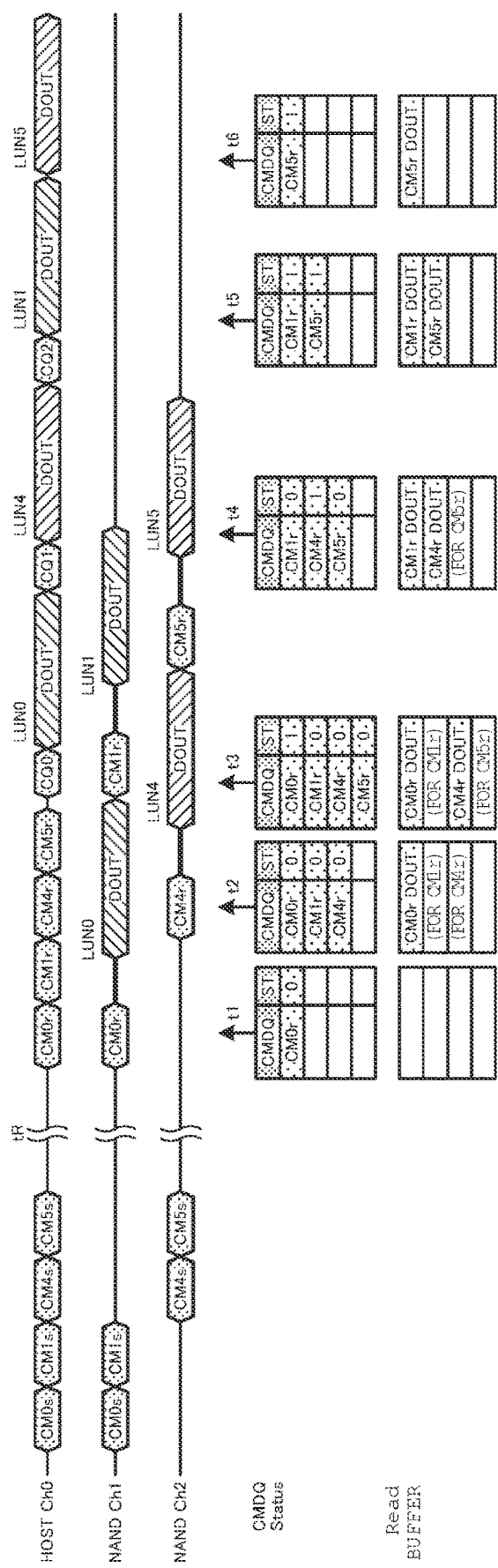
FIG. 3 is a diagram showing an operation of the semiconductor device according to the first embodiment.

A "CMDQ Status" table shown in FIG. 3 shows information indicating the execution status of the command stored in the command queue 101a. "ST" in the "CMDQ Status" table indicates the processing status of each command. A case where "ST" is "0" indicates that the command processing is not completed. A case where "ST" is "1" indicates that the command processing is completed. The read buffer shown in FIG. 3 indicates information stored in the read buffer memory 102.

The bridge chip BC receives a data output command CM*r after a data setup command CM*s (* corresponds to a LUN number) is received from the host HA and after the data transfer from the memory cell array 111 of the target LUN to the buffer memory 113 is completed (the data setup command CM*s is omitted in the following operation examples). The data setup command CM*s is a read processing preparation command. An operation example of FIG. 3 shows an example when a data output command CM0r for the chip LUN0, a data output command CM1r for the chip LUN1, a data output command CM4r for the LUN4, and a data output command CM5r for the LUN5 are sequentially received from the host HA. In this example, the command decoder 101b decodes each of the data output commands CM0r, CM1r, CM4r, and CM5r and stores the decoded data output commands in the command queue 101a.

The command issuance timing control unit 101e issues the data output command CM*r according to the availability of the channel Ch1 or Ch2. Specifically, when the data output command CM0r is stored in the command queue 101a, the command issuance timing control unit 101e issues the data output command CM0r to the channel Ch1. The data output command CM0r is set as the status of the "CMDQ Status" table at a timing t1, and "0" indicating that the read from the channel Ch1 is not completed is set as "ST". Further, the memory cell array 111 sends the data to be read, which is stored in the buffer memory 113, to the bridge chip BC.

Further, when the data output command CM1r is stored in the command queue 101a, the channel Ch1 to which the data output command CM1r is issued is executing the command, so that the command issuance timing control unit 101e does not issue the data output command CM1r to the channel Ch1. The buffer control unit 101g subsequently stores the read data sent from the chip LUN0 during a DOUT period in an "CM0r DOUT" area of the read buffer memory 102.

Subsequently, when the data output command CM4r is stored in the command queue 101a, the command issuance timing control unit 101e issues the data output command CM4r stored in the command queue 101a to the channel Ch2. In this way, the command issuance timing control unit 101e sequentially issues the data output commands stored in the command queue 101a to the channel Ch1 or the channel Ch2.

The data output command CM1r and the data output command CM4r are set in the "CMDQ Status" table at a timing t2, and "0" indicating that the commands are not completed is set in the "ST" of the commands. Further, as for the data output command CM0r, all the read data sent from the chip LUN0 is not stored in the read buffer memory 102, so that the flag information of the data output command CM0r also goes into "0".

Further, when the output of the read data from the chip LUN0 is completed, the command issuance timing control unit 101e issues the data output command CM1r to the chip LUN1. Further, the command queue status management unit 101c updates "ST" of "CM0r" in the "CMDQ Status" table to "1". When a predetermined number of commands are issued, the host HA issues a command CQ0 indicating status confirmation. The command queue status management unit 101c transmits the information of the "CMDQ Status" table to the host HA.

The host HA refers to information in the "CMDQ Status" table and reads out the read data of the data output command in which "ST" goes into "1". At the time of timing t3, "ST" of "CM0r" is "1", so that the host HA requests to read the read data of the chip LUN0 corresponding to the data output command CM0r. Accordingly, the buffer control unit 101g transmits data in the "CM0r DOUT" area of the read buffer memory 102 to the host HA. The command queue status management unit 101c deletes the record of "CM0r" in the "CMDQ Status" table in response to the completion of transmission of the read data of the data output command CM0r to the host HA.

At the time of timing t4, "ST" of "CM4r" in the "CMDQ Status" table goes into "1". Since all the read data sent from the chip LUN5 in response to the data output command CM5r issued before timing t4 is not stored in the read buffer memory 102, "ST" in the data output command CM5r goes into "0". At the time of timing t5, "ST" of "CM1r" and "CM5r" which are not completely read goes into "1".

In this way, the bridge chip BC executes the read command stored in the command queue 101a, stores the read data corresponding to the data output command from the first chip group CP1 or the second chip group CP2 in the read buffer memory 102, and transmits the read data to the host HA according to the execution status of the command in the command queue 101a. The bridge chip BC may store a plurality of commands in the command queue 101a and sequentially executes the commands to transmit the read data to the host HA according to the status in which the read data is stored in the read buffer memory 102, so that the processing may be executed between the host HA and the bridge chip BC without any waiting time.

Second Embodiment

In the first embodiment, after all the read data corresponding to the data output command is stored in the read buffer memory 102, the next data output command is issued to the chip. In a second embodiment, after a part of read data corresponding to the data output command is stored in the read buffer memory 102, the next data output command is issued to the chip.

Figure 4:
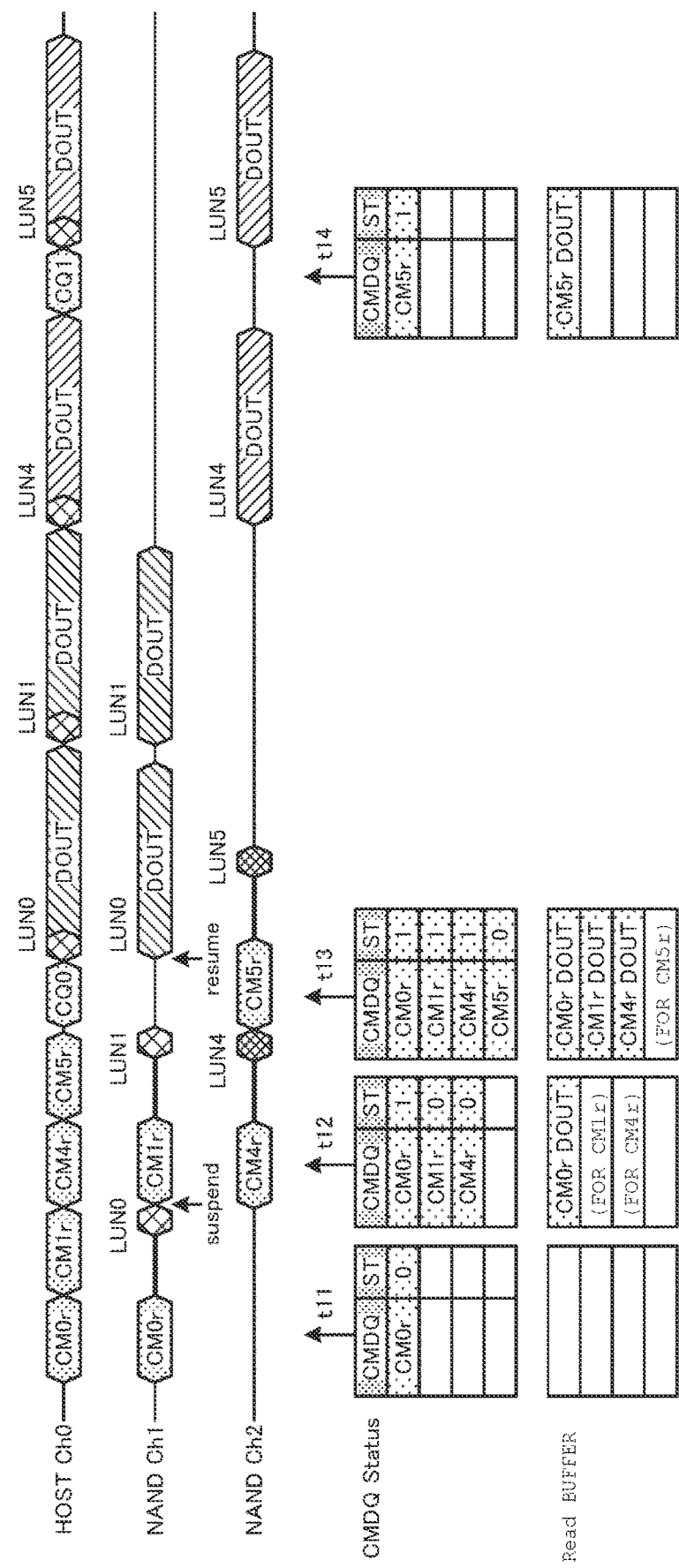
FIG. 4 is a diagram showing an operation of a semiconductor device according to a second embodiment.

An operation example according to the second embodiment will be described with reference to FIG. 4. The points in common with the content shown in FIG. 3 will not be repeated. A state at the time of timing t11 is the same as a state at the time of timing t1 in FIG. 3. When the data output command CM0r is issued to the chip LUN0 and the buffer control unit 101g stores the read data of a predetermined size in the read buffer memory 102 after timing t11, the reception of the read data from the chip LUN0 is interrupted. Accordingly, the command issuance timing control unit 101e issues the data output command CM1r to the chip LUN1. The data output command CM0r is an example of a first read command, and the data output command CM1r is an example of a second read command. Further, the command queue status management unit 101c updates "ST" of "CM0r" in the "CMDQ Status" table to "1". As a result, at the timing t12, "ST" of "CM0r" in the "CMDQ Status" table goes into "1".

Also, for other data output commands, the bridge chip BC updates "ST" of "CM*r" in the "CMDQ Status" table to "1" at the time in which a part of read data is stored in the read buffer memory 102. That is, the same processing is executed for the data output command CM1r and the data output command CM4r. Then, at a timing t13, which is a timing in which the command CQ0 indicating status confirmation is issued after the host HA has finished issuing the data output commands, "ST" in each of "CM0r", "CM1r", and "CM4r" of the "CMDQ Status" table goes into "1".

Further, when the host HA starts reading the read data, the buffer control unit 101g stores remaining read data from the target chip LUN in the read buffer memory 102. For example, when the host HA requests to read the read data of the chip LUN0 corresponding to the data output command CM0r, the buffer control unit 101g stores the remaining read data from the target chip LUN in the read buffer memory 102.

As described above, the bridge chip BC according to the second embodiment stores a part of read data corresponding to the data output command CM*r in the read buffer memory 102. After that, the bridge chip BC according to the second embodiment stores remaining read data corresponding to the data output command CM*r from the first chip group CP1 or the second chip group CP2 in the read buffer memory 102 based on the status of other data output commands CM*r. As a result, the host HA may read the read data at an earlier timing than the case of the bridge chip BC according to the first embodiment. In addition, the capacity of the read buffer memory 102 may also be reduced.

Third Embodiment

In the first embodiment and the second embodiment, the case where the bridge chip BC executes command processing based on the order of the commands transmitted from the host HA is described. In the present embodiment, the order of processing the commands is changed based on the designation from the host HA.

Figure 5:
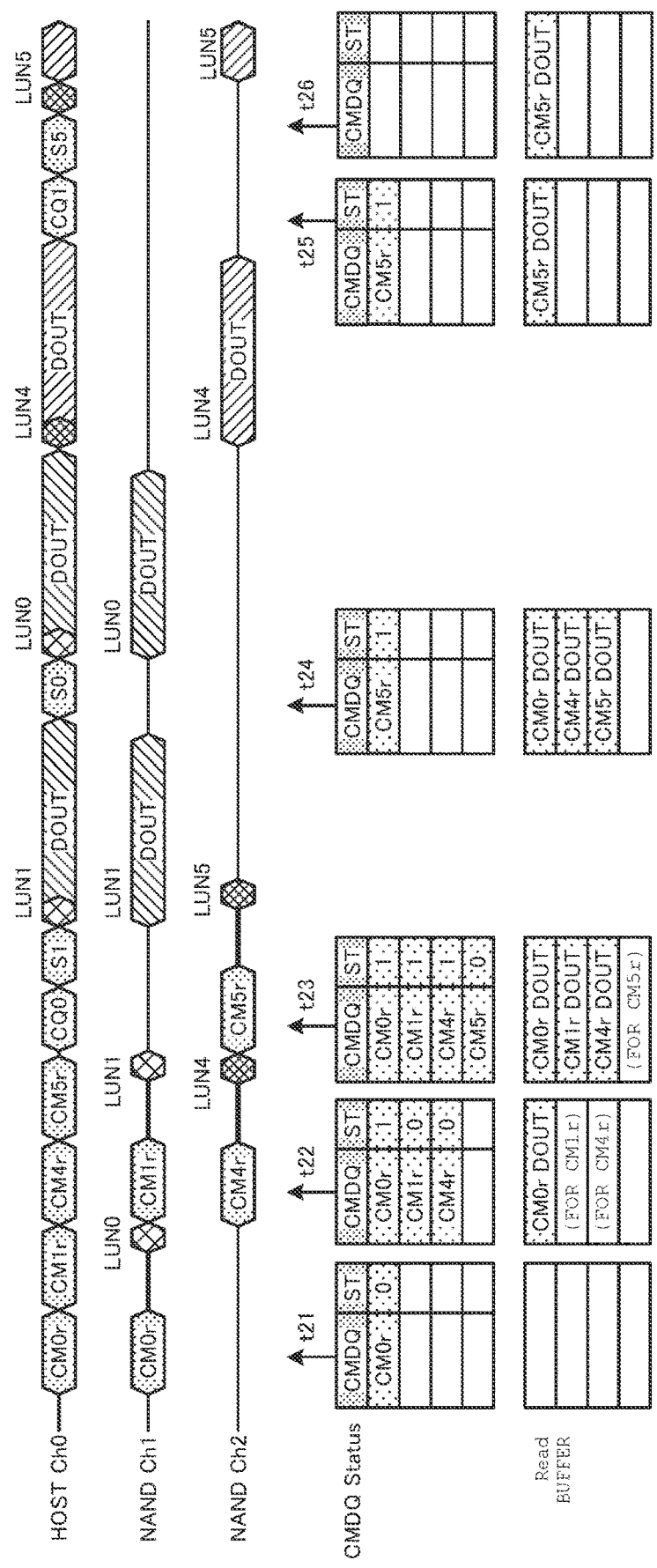
FIG. 5 is a diagram showing an operation of a semiconductor device according to a third embodiment.

An operation example according to a third embodiment will be described with reference to FIG. 5. The points in common with FIG. 4 will not be repeated. A processing at a timing t21 to a timing t23 is the same as the processing performed at the timing t11 to the timing t13 in FIG. 4. After issuing the command CQ0 indicating status confirmation, the host HA issues a command S1 indicating that the data output command CM1r is prioritized. The command issuance timing control unit 101e of the bridge chip BC instructs the buffer control unit 101g to send the read data of the chip LUN1. Accordingly, the buffer control unit 101g reads out the read data of the chip LUN1 instead of the chip LUN0.

In this way, the bridge chip BC may flexibly change a timing or an order of transmitting the read data to be extracted by the host HA by changing a data extraction order according to the instruction from the host HA.

Fourth Embodiment

In a fourth embodiment, a processing performed when a write processing command is received from the host HA will be described. In the data write processing, write data is received after a particular period of time has elapsed after receiving the data write command from the host HA. Then, there is a problem that a waiting time occurs between receiving the data write command and the write data from the host, so that efficient execution of the data write processing is not possible. Therefore, in the present embodiment, the write processing is efficiently executed by executing the write processing via the write buffer memory 103.

Figure 6:
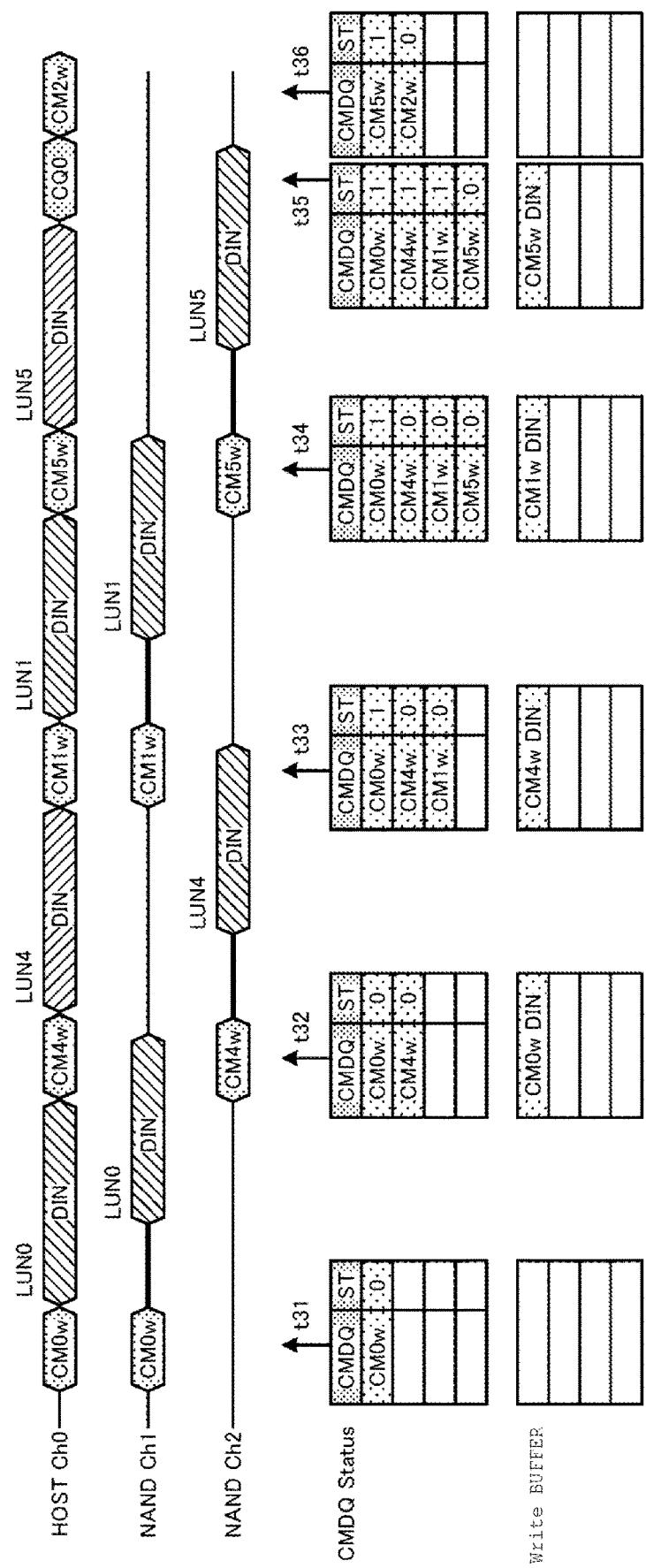
FIG. 6 is a diagram showing an operation of a semiconductor device according to a fourth embodiment.

An operation example according to the fourth embodiment will be described with reference to FIG. 6. FIGS. 3 to 5 show the examples using the read buffer but FIG. 6 shows an examples using the write buffer instead. The host HA issues a write command CM0w indicating the write processing command to the chip LUN0. Then, the command decoder 101b decodes the write command CM0w and stores the decoded write command CM0w in the command queue 101a. In the "CMDQ Status" table at a timing t31, the write command CM0w is set, and "0" indicating that the write is not completed is set as "ST".

The host HA issues the write command CM0w to transmit, as DIN of the chip LUN0, the write data to the chip LUN0 to the bridge chip BC. The buffer control unit 101g of the bridge chip BC writes the write data to the chip LUN0 to the write buffer memory 103. The buffer control unit 101g provides an area for the write data to the chip LUN0 in the write buffer memory 103.

Then, after transmitting the write data (DIN) to the chip LUN0, the host HA issues a write command CM4w indicating the write processing command to the chip LUN0. Since the write data is written to the write buffer memory 103, the host HA does not need to consider the waiting time for the write processing of the write data between the bridge chip BC and the chip LUN0. Therefore, at the time of a timing t32, the write command CM4w is issued as shown in NAND Ch2 before the write processing from the bridge chip BC to the chip LUN0 is completed as shown in NAND Ch1.

Further, at the time of a timing t33, since the write processing of the write data between the bridge chip BC and the chip LUN0 is completed, the "ST" of "CM0w" in the "CMDQ Status" table is updated to "1".

Another operation example according to the fourth embodiment will be described with reference to FIG. 7. FIG. 6 describes a case where only an area for the write data corresponding to one command is provided in the write buffer memory 103. In the present operation example, an area for the write data corresponding to a plurality of commands is provided.

Figure 7:
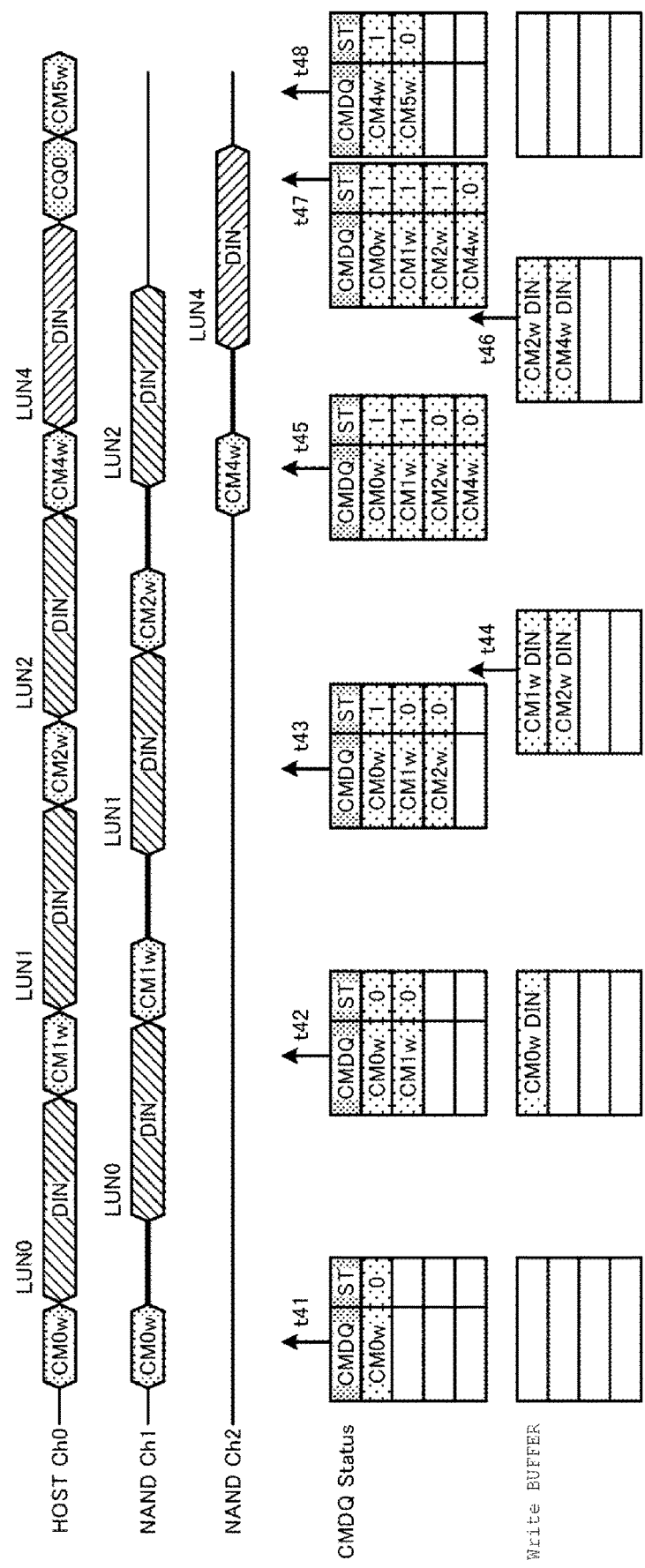
FIG. 7 is a diagram showing another operation of the semiconductor device according to the fourth embodiment.

In this case, as shown in FIG. 7, when "CM1w" and "CM2w" are set in the "CMDQ Status" table at a timing t43, the buffer control unit 101g provides the write data area to the chip LUN1 and the chip LUN2 to the write buffer memory 103. Further, as at the time of a timing t45, when "CM1w" of completion ("ST" is "1") is set in the "CMDQ Status" table, and "CM4w" of incompleteness ("ST" is "0") is newly set, the buffer control unit 101g newly provides the write data area to the chip LUN0 in the write buffer memory 103 at a timing t46. At this time, the buffer control unit 101g deletes the write data area to the chip LUN1 from the write buffer memory 103. As a result, the bridge chip BC may process the write processing for the chip group CP1 and the write processing for the chip group CP2 in parallel.

As described above, the bridge chip BC provides the write buffer memory 103, and in response to receiving the write command (for example, the write command CM0w) from the host HA, the bridge chip BC writes the write data of the command to the write buffer memory 103. Then, the bridge chip BC writes the write data stored in the write buffer memory 103 to the chip LUN. In this case, since the bridge chip BC writes the write data to the write buffer memory 103, the host HA may issue a command without considering the processing time between the bridge chip BC and the chip LUN.

Fifth Embodiment

A fifth embodiment is an embodiment for a processing performed when a plurality of types of commands are mixed. In the fifth embodiment, it is assumed that the data output command, the write command, and the erase command are mixed.

Figure 8:
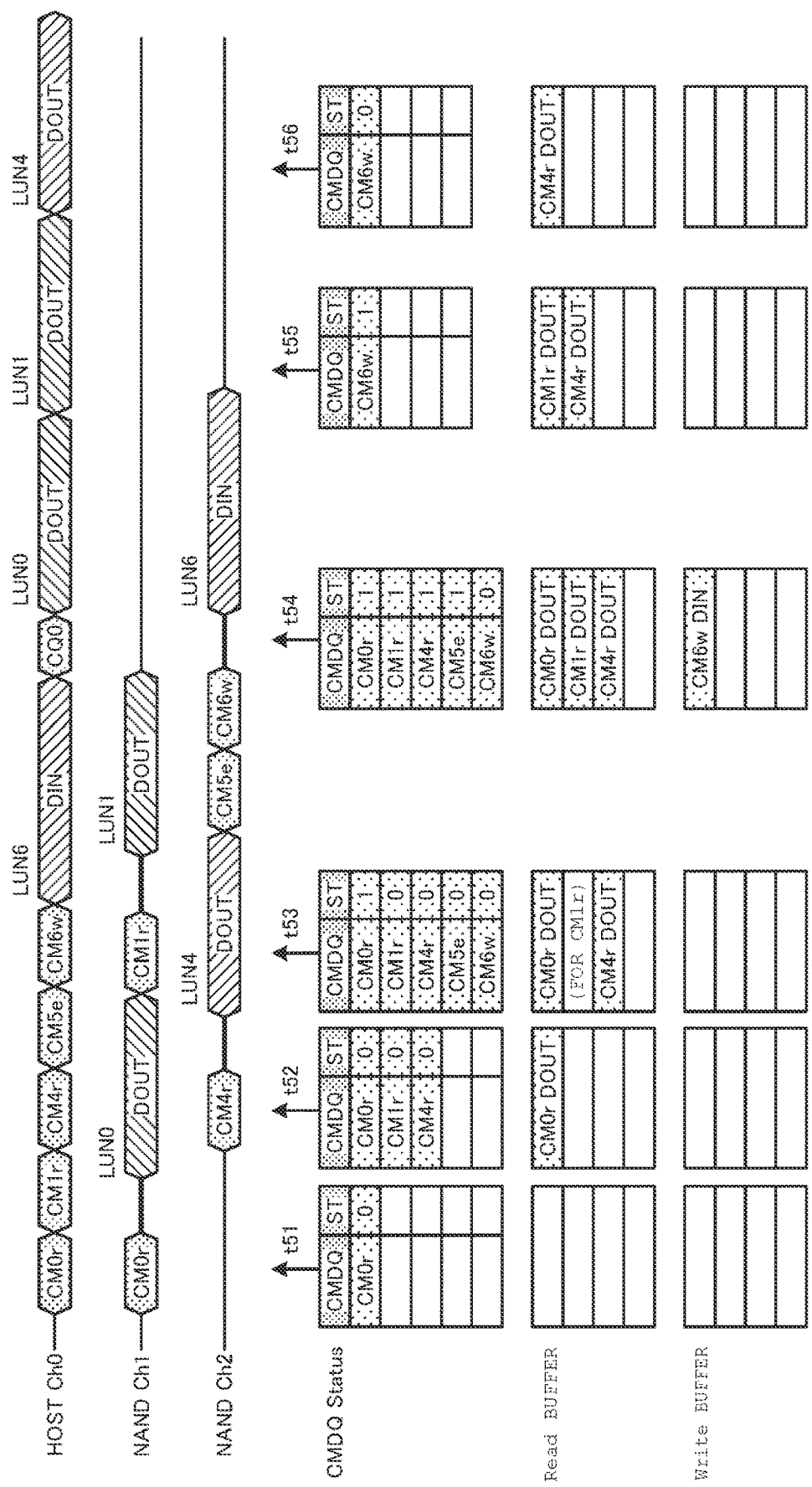
FIG. 8 is a diagram showing an operation of a semiconductor device according to a fifth embodiment.

An operation example in the fifth embodiment will be described with reference to FIG. 8. The host HA issues a data output command CM0r indicating the read processing command to the chip LUN0. Subsequently, the host HA issues a data output command CM1r indicating the read processing command to the chip LUN1. Subsequently, the host HA issues a data output command CM4r indicating the read processing command to the chip LUN4. Subsequently, the host HA issues an erase command CM5e indicating an erase processing command to the chip LUN5. Subsequently, the host HA issues a write command CM6w indicating the write processing command to the chip LUN6.

Upon receiving the commands, the bridge chip BC stores each command in the command queue 101a. Further, the bridge chip BC registers a record indicating the statuses of the commands in the "CMDQ Status" table. For the records of the data output command and the erase command, the bridge chip BC deletes the records after the issuance of the command is completed and the status of the command is transmitted to the host HA.

After storing the commands in the command queue 101a, the bridge chip BC executes the same processing as in the first embodiment for the data output commands CM0r, CM1r, and CM4r, and executes the same processing as in the fourth embodiment for the write command CM6w. For the erase command CM5e, the bridge chip BC issues the erase command to the target chip LUN5 after extracting the command from the command queue 101a.

When the command CQ0 for status confirmation is received, the bridge chip BC transmits information of the "CMDQ Status" table to the host HA at a timing t54, and the host HA requests to read the chip (for example, the chip LUN0 in response to the transmitted information.

As described above, the bridge chip BC may store not only the data output command but also the write processing command and the erase processing command in the command queue 101a, and sequentially executes the commands to transmit the read data to the host HA according to the status in which the read data is stored in the read buffer memory 102, so that the processing may be executed without occurrence of the waiting time between the host HA and the bridge chip BC even when the write processing commands and the erase processing commands are mixed.

Sixth Embodiment

In a sixth embodiment, when a priority command, which is a command in which the execution order is prioritized, exists, the priority command is preferentially executed regardless of the command order issued by the host HA.

Figure 9:
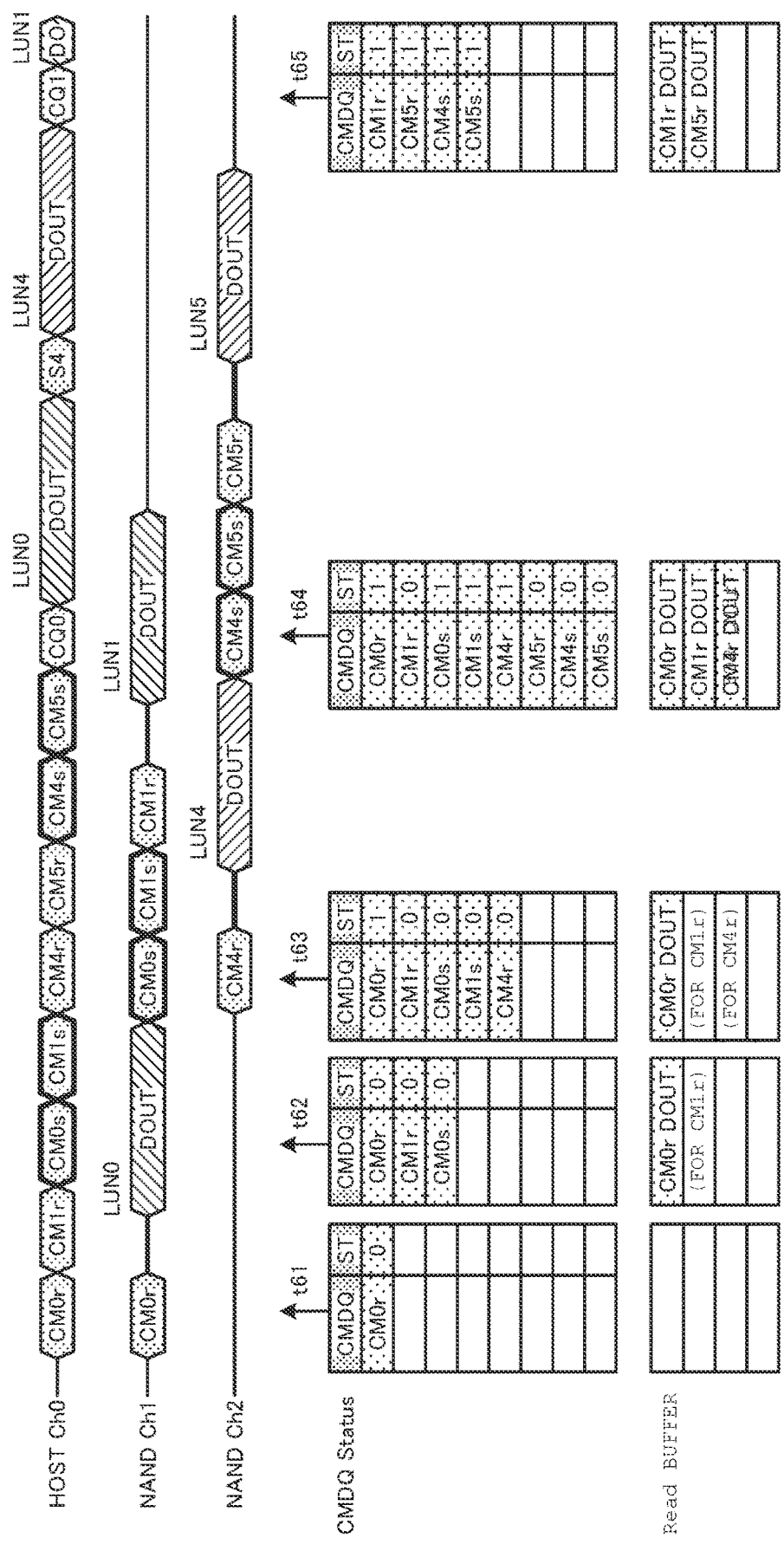
FIG. 9 is a diagram showing an operation of a semiconductor device according to a sixth embodiment.

An operation example according to the sixth embodiment will be described with reference to FIG. 9. CM*r is a data output command. CM* s is a data setup command. It is assumed that the command priority control unit 101d prioritizes the data setup command.

The host HA issues commands in the order of the data output command CM0r, the data output command CM1r, a data setup command CM0s, a data setup command CM1s, . . . , a data setup command CM5s.

At a timing t61, only the data output command CM0r is stored in the command queue 101a. After the timing t61, the bridge chip BC issues the commands to the channel Ch1 in the order of the data setup command CM0s, the data setup command CM1s, and the data output command CM1r. At a timing t62, the data output command CM0r, the data output command CM1r, and the data setup command CM0s are stored in the command queue 101a. After the read data output from the chip LUN0 is completed, the data setup command CM0s is preferentially executed although the data output command CM1r is issued earlier by the host HA.

The reason for this is that the processing time of the data setup command is longer than the processing time of the data output command. In this way, the performance of the entire system may be improved by the bridge chip BC preferentially processing commands that take a long time to be processed.

Seventh Embodiment

In a seventh embodiment, a peak current suppression control is performed on the chip group CP1 or the chip group CP2. Here, the read processing and the write processing will be described separately.

Figure 10:
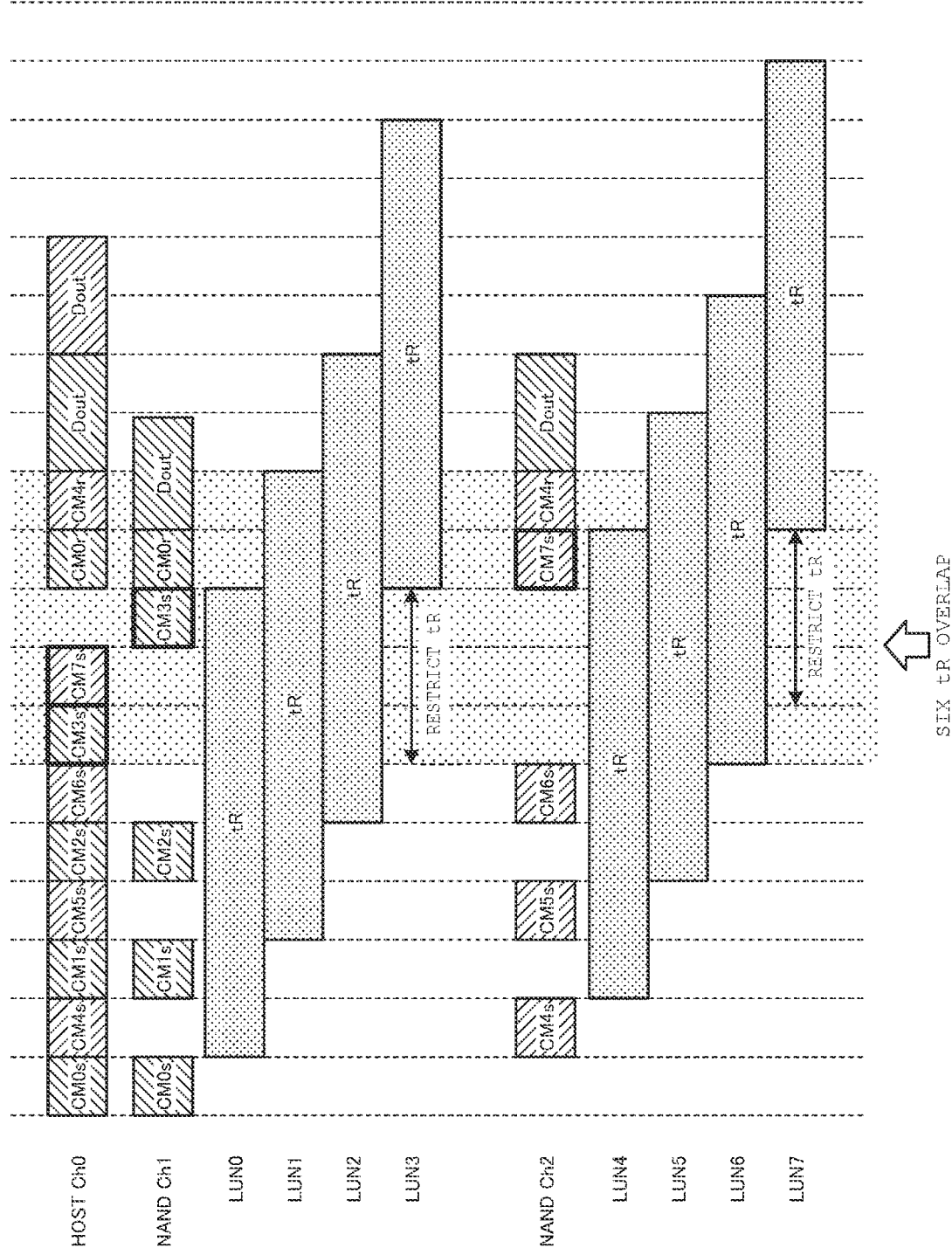
FIG. 10 is a diagram showing an operation of a semiconductor device according to a seventh embodiment.

FIG. 10 shows an operation example of the read processing according to the seventh embodiment. In an example of FIG. 10, the host HA issues the data setup command CM*s and issues the data output command CM*r. It is assumed that the bridge chip BC issues data setup commands CM0s, CM4s, CM1s, CM5s, CM2s, and CM6s.

In the status, when the bridge chip BC is scheduled to further issue data setup commands CM3s and CM7s, the bridge chip BC restricts or waits for an issuance timing of the data setup commands CM3s and CM7s until some of the six data setup commands are completed. During a period (tR) in which the processing of transferring the data to be read is performed from the memory cell array 111 to the buffer memory 113, the processing loads of the chips increase, so it is desirable to be able to adjust the number of chips corresponding to the period of tR.

As described above, when the bridge chip BC adjusts the number of chips LUN executing the processing of transferring the data to be read from the memory cell array 111 to the buffer memory 113, the peak current of the chip group CP1 or the chip group CP2 may be reduced.

Figure 11:
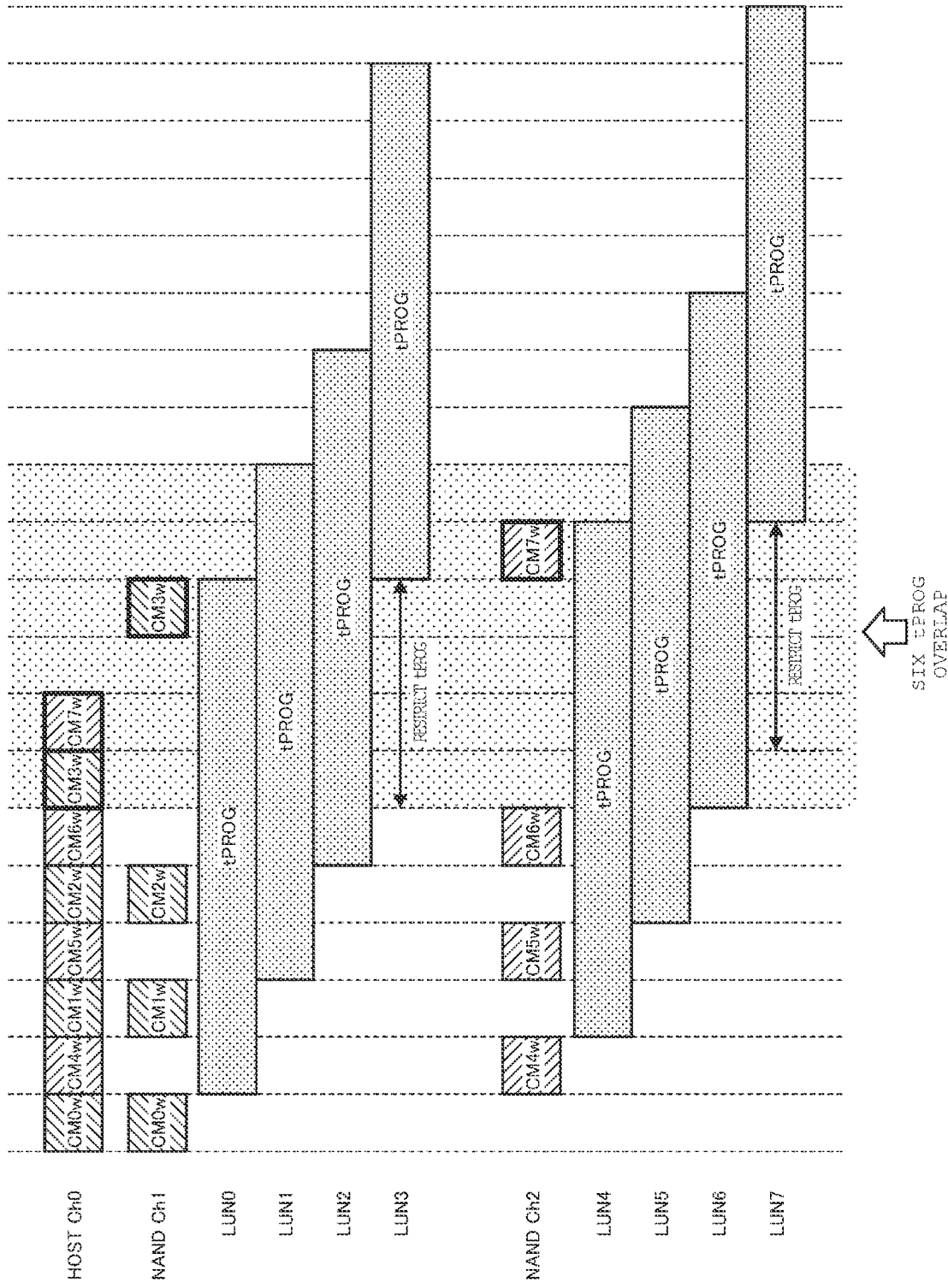
FIG. 11 is a diagram showing another operation of the semiconductor device according to the seventh embodiment.

FIG. 11 shows an operation example of the write processing according to the seventh embodiment. In the example of FIG. 11, the host HA issues a write command CM*w. It is assumed that the bridge chip BC issues write commands CM0w, CM4w, CM1w, CM5w, CM2w, and CM6w.

In the status, when the bridge chip BC is scheduled to further issue write commands CM3w and CM7w the bridge chip BC restricts or waits for an issuance timing of the write commands CM3w and CM7w until some of the six write commands are completed.

During a period (tPROG) in which the processing of transferring the data to be written is performed from the buffer memory 113 to the memory cell array 111, the processing loads of the chips increase, so it is desirable to be able to adjust the number of chips corresponding to the period of tPROG.

As described above, the bridge chip BC adjusts the number of chips LUN executing the processing of transferring the data to be written from the buffer memory 113 to the memory cell array 111, the peak current of the chip group CP1 or the chip group CP2 may be reduced.

Eighth Embodiment

In an eighth embodiment, an RBZ signal of the chip of the chip group CP1 or the chip group CP2 is monitored, and a command is issued based on the result.

Figure 12:
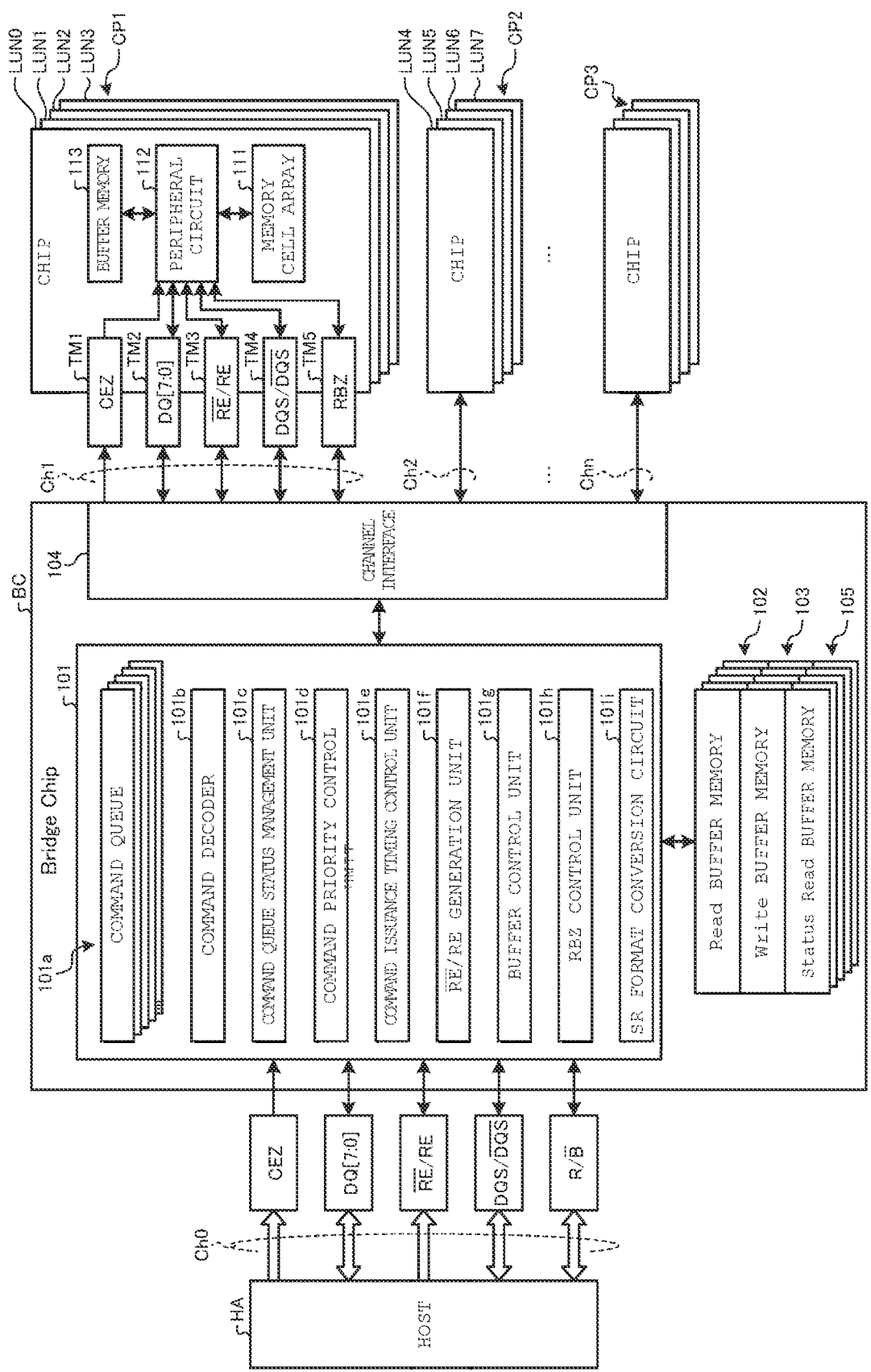
FIG. 12 is a diagram showing a configuration of a semiconductor device according to an eighth embodiment.

A configuration of a semiconductor device 1A according to the eighth embodiment will be described with reference to FIG. 12. The description of a part that overlaps with content shown in FIG. 2 will not be repeated. The semiconductor device 1A according to the eighth embodiment further includes an RBZ control unit 101h and an SR format conversion circuit 101i.

The RBZ control unit 101h controls to monitor an RBZ signal. Here, the RBZ signal is a signal indicating whether or not the chip LUN of the chip group CP1 or the chip group CP2 is in a status of capable of receiving and executing a command from the bridge chip BC. The SR format conversion circuit 101*i* performs format conversion on a status read data. Here, the status read data is the status information of the chip LUN of the chip group CP1 or the chip group CP2. A status read buffer memory 105 is a buffer memory for storing the result of a status read command. Each of the chips LUN further has a terminal group TM5. The terminal group TM5 is a terminal group for the RBZ signal.

Subsequently, an operation example of the semiconductor device 1A in the eighth embodiment will be described with reference to FIG. 13. HOST Ch0 shown in FIG. 13 indicates a signal exchanged between the host HA and the bridge chip BC via the wired communication path CH0. NAND Ch1 shown in FIG. 13 indicates a signal exchanged between the bridge chip BC and the chip group CP1 via the channel CH1.

Figure 13:
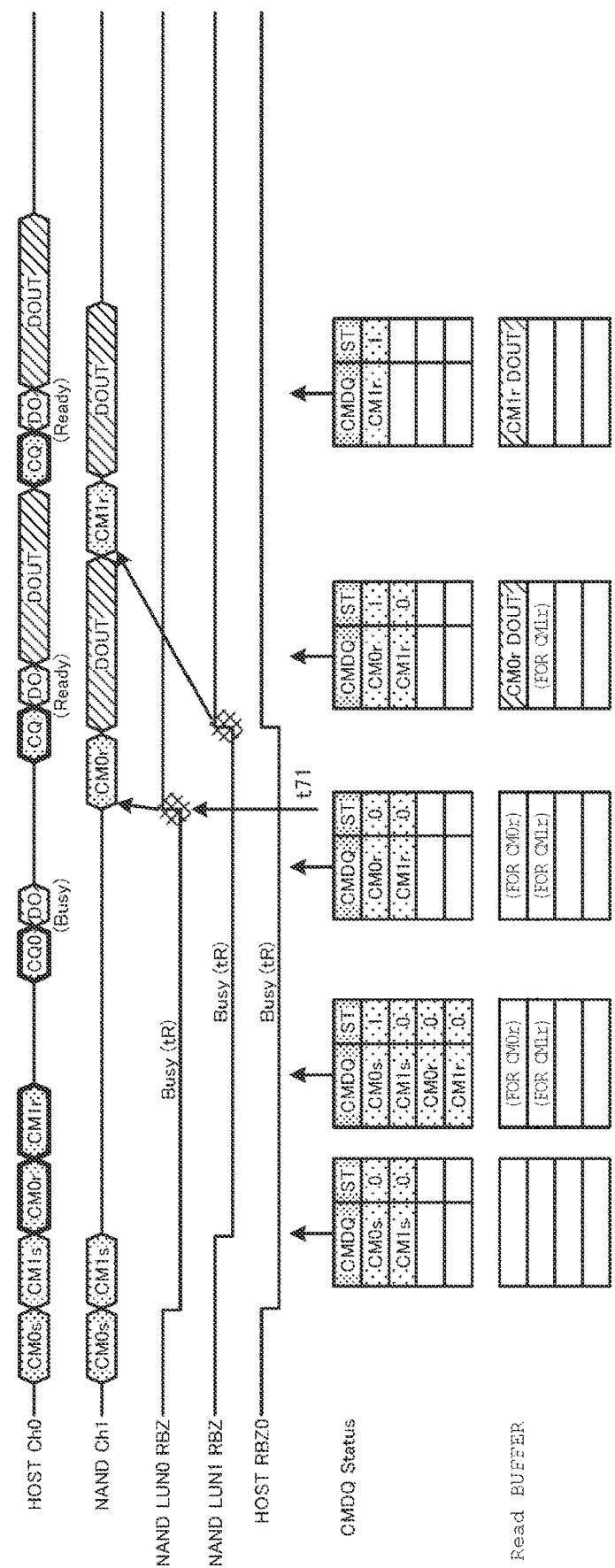
FIG. 13 is a diagram showing an operation of the semiconductor device according to the eighth embodiment.

NAND LUN0 RBZ shown in FIG. 13 indicates the level of the RBZ signal in the chip LUN0. NAND LUN1 RBZ shown in FIG. 13 indicates the level of the RBZ signal in the chip LUN1. HOST RBZ0 shown in FIG. 13 indicates the level of the RBZ signal in the bridge chip BC.

A "CMDQ Status" table shown in FIG. 13 shows information indicating the execution statuses of commands stored in the command queue 101*a*. The read buffer shown in FIG. 13 indicates information stored in the read buffer memory 102.

CM*r is a data output command. CM* s is a data setup command. The host HA issues commands in the order of the data setup command CM0*s*, the data setup command CM1*s*, the data output command CM0*r*, and the data output command CM1*r*.

The bridge chip BC issues the data setup command CM0*s* to the chip LUN0, and issues the data setup command CM1*s* to the chip LUN1. Then, the RBZ signal in the chip LUN0 and the RBZ signal in the chip LUN1 go into Busy. The RBZ control unit 101*h* monitors the RBZ signals. The command issuance timing control unit 101*e* issues the data output command CM0*r* to the chip LUN0 at the time of a timing t71 in which the busy status of the RBZ signal in the chip LUN0 is released.

In this way, the bridge chip BC monitors the RBZ signal of the chip and issues the data output command to the chip according to the status of the RBZ signal, so that the data output command may be executed efficiently without issuing a command to refer to the status of the chip LUN from the host HA.

Ninth Embodiment

A semiconductor device 1B in a ninth embodiment performs format conversion on the result of the status read command and outputs the result of the conversion. Each of the chips LUN0 to LUN7 has a plurality of parallel operation elements (planes). It is assumed that each of the chips LUN0 to LUN7 has four planes.

Subsequently, an operation example of the semiconductor device 1B in the ninth embodiment will be described with reference to FIG. 14. HOST Ch0 shown in FIG. 14 indicates a signal exchanged between the host HA and the bridge chip BC via the wired communication path CH0. NAND Ch1 indicates a signal exchanged between the bridge chip BC and the chip group CP1 via the channel CH1. NAND Ch2 indicates a signal exchanged between the bridge chip BC and the chip group CP2 via the channel CH2.

Figure 14:
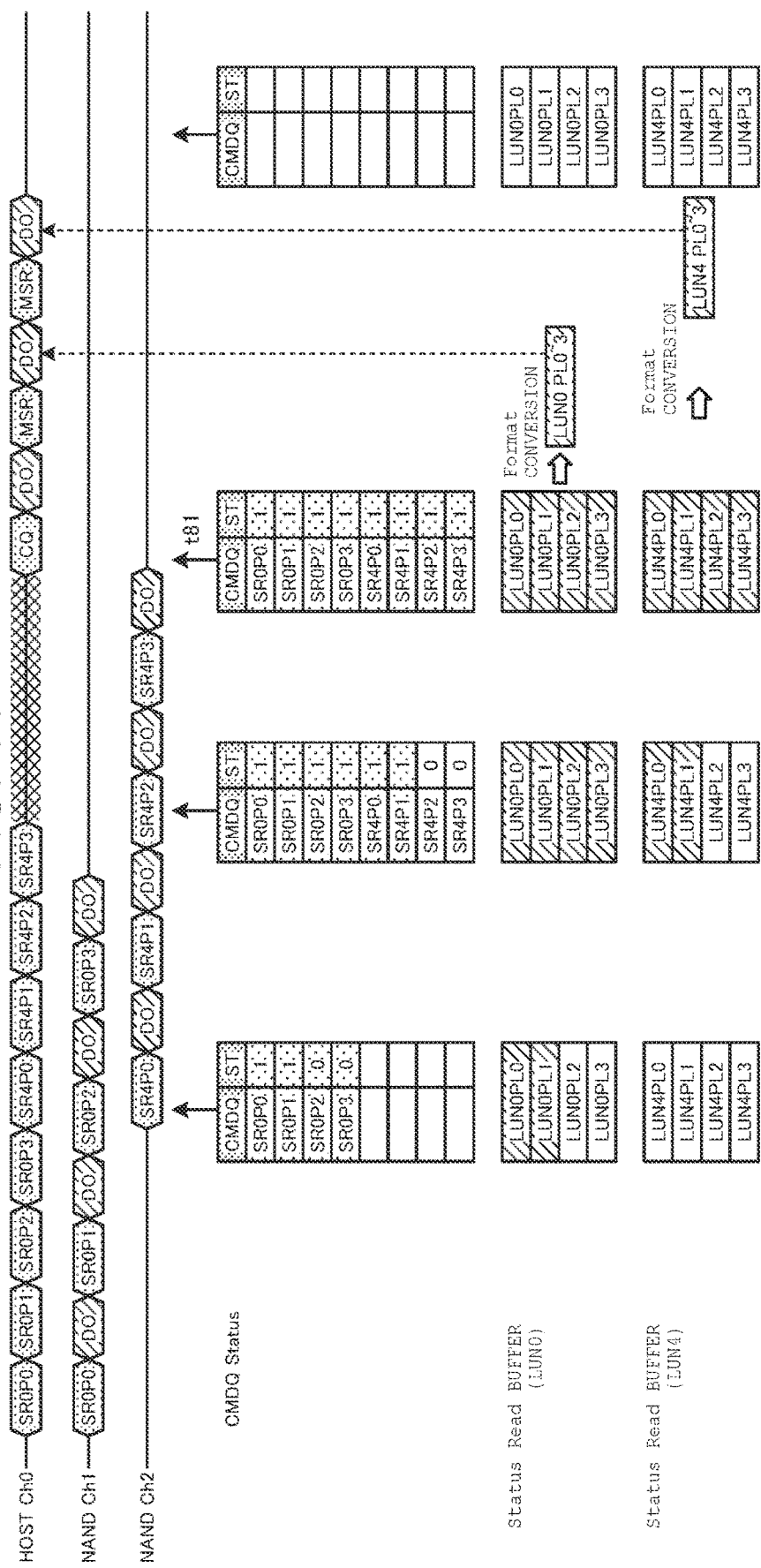
FIG. 14 is a diagram showing an operation of a semiconductor device according to a ninth embodiment.

A "CMDQ Status" table shown in FIG. 14 shows information indicating the status of the command queue 101*a*. A status read buffer (LUN0) shown in FIG. 14 shows information for the chip LUN0 stored in the status read buffer memory 105. The status read buffer (LUN4) shown in FIG. 14 shows information for the chip LUN4 stored in the status read buffer memory 105.

SR*P #is the status read command. * corresponds to the LUN number. #corresponds to a plane number. DO immediately after SR*P #in NAND Ch1 and NAND Ch2 indicates data read corresponding to the status read command.

The host HA issues status read commands SR0P0, SR0P1, SR0P2, SR0P3, SR4P0, SR4P1, SR4P2, and SR4P3.

The bridge chip BC issues the status read command SR0P0 or the like to the chip LUN0 or LUN4, reads the data corresponding to the status read command from the chip LUN0 or LUN4, and stores the data in the status read buffer memory 105.

When the host HA issues the status confirmation command CQ at a timing t81 which is a status in which all the status read commands are completed, the bridge chip BC transmits the result to the host HA. The status confirmation command CQ is a command for confirming the execution status of the status read command. The host HA issues a merge processing command MSR according to the result. The merge processing command MSR is a command instructing execution of merge processing of the result of the status read command. DO immediately after CQ and MSR in HOST Ch0 indicates transmission of data corresponding to the status confirmation command CQ and the merge processing command MSR. In response to the commands, the SR format conversion circuit 101*i* of the bridge chip BC converts the information of the status read buffer memory 105 and transmits the result of the conversion to the host HA.

The host HA designates a template number when issuing the merge processing command MSR. Here, a conversion example of the information related to the status read command will be described with reference to FIGS. 15A and 15B.

FIG. 15A shows data read by the status read command of planes PL0 to PL3. As shown in FIG. 15A, the read data contains the information of eight items. FIG. 15B is a diagram showing the conversion example. As shown in FIG. 15B, for example, when a template number 1 is designated, the SR format conversion circuit 101*i* generates information obtained by extracting information on item numbers 5 and 6 of the planes PL0 to PL3 (a part surrounded by a thick solid line in FIG. 15A). When a template number 2 is designated, the SR format conversion circuit 101*i* generates information obtained by extracting information on the item numbers 0 and 1 of the planes PL0 to PL3 (a part surrounded by a thick dotted line in FIG. 15A).

Figures 16A, 16B:
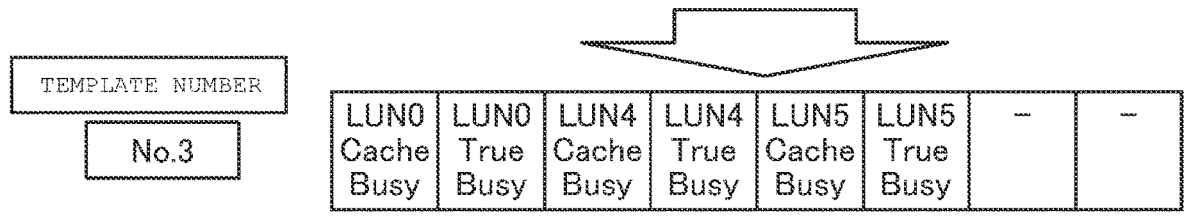
FIG. 16A is a diagram showing another example of the data read by the status read command according to the ninth embodiment.
FIG. 16B is a diagram showing another example of the data in which the read data according to the ninth embodiment is formatted.

When the data of the status read command of the chip LUN is read as shown in FIG. 16A, the data corresponding to a preset template number is stored as shown in FIG. 16B but the read data of the other parts may be discarded. In this case, the capacity of the status read buffer memory 105 may be reduced.

In this way, the bridge chip BC performs conversion on the information in the status read buffer memory 105 and transmits the result of conversion to the host HA. As a result, the host HA does not need to read as many planes as the number of planes, and the processing load may be reduced.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor device comprising:
a first chip having a terminal to which a signal from a host is configured to be input;
a second chip group having a plurality of second chips electrically connected to the first chip; and
a third chip group having a plurality of third chips electrically connected to the first chip in parallel with the second chip group, wherein the first chip includes:
a command queue configured to store a plurality of read commands received from the host; and
a read buffer memory configured to buffer read data from the second chip group or the third chip group; and the first chip is configured to:
sequentially issue the plurality of read commands stored in the command queue from the command queue to the second chip group or the third chip group;
store, in the read buffer memory, the read data retrieved from the second chip group or the third chip group in response to issuance, by the first chip, of the plurality of read commands to the second chip group or the third chip group; and
transmit any read data among the read data stored in the read buffer memory to the host based on an execution status of any read command among the plurality of read commands issued to the second chip group or the third chip group, wherein
an execution order of the plurality of read commands stored in the command queue is variable.

2. The semiconductor device according to claim 1, wherein
the first chip is configured to:
store a part of read data corresponding to a first read command among the plurality of read commands from the second chip group or the third chip group, in the read buffer memory; and
store remaining read data corresponding to the first read command from the second chip group or the third chip group based on an execution status of a second read command other than the first read command, in the read buffer memory.

3. The semiconductor device according to claim 1, wherein
the first chip further includes a write buffer memory,
the first chip is configured to receive a write command from the host, store write data related to the write command in the write buffer memory, and write the stored write data to the second chip group or the third chip group.

4. The semiconductor device according to claim 1, wherein
the first chip is configured to receive a command different from the read command from the host, and further store the different command in the command queue.

5. The semiconductor device according to claim 1, wherein
when the first chip receives a priority command for designating a command that is preferentially to be executed from the host, the first chip is configured to execute the command stored in the command queue and preferentially to be executed in response to the received priority command.

6. The semiconductor device according to claim 1, wherein
a plurality of planes that are parallel operation elements are defined in each of the second chips and the third chips, and
the first chip is configured to transmit information obtained by editing a status of each plane to the host.

7. A control method for controlling a semiconductor device which is connectable to a host and comprises a first chip having a command queue configured to store a plurality of read commands received from the host, and a read buffer memory configured to buffer read data, a second chip group having a plurality of second chips electrically connected to the first chip, and a third chip group having a plurality of third chips electrically connected to the first chip in parallel with the second chip group, the control method comprising:
sequentially issuing the plurality of read commands received from the host and stored in the command queue of the first chip to the second chip group or the third chip group;
storing, in the read buffer memory of the first chip, read data read from the second chip group or the third chip group corresponding to the plurality of read commands issued, by the first chip, to the second chip group or the third chip group from the command queue of the first chip; and
transmitting any read data among the read data stored in the read buffer memory of the first chip to the host based on an execution status of any read command among the plurality of read commands issued to the second chip group or the third chip group from the command queue of the first chip, wherein
an execution order of the plurality of read commands stored in the command queue is variable.

8. The control method of claim 7, further comprising:
storing a part of read data corresponding to a first read command among the plurality of read commands from the second chip group or the third chip group, in the read buffer memory; and
storing remaining read data corresponding to the first read command from the second chip group or the third chip group based on an execution status of a second read command other than the first read command, in the read buffer memory.

9. The control method of claim 7, further comprising:
receiving a write command from the host;
storing write data related to the write command in a write buffer memory; and
writing the stored write data to the second chip group or the third chip group.

10. The control method of claim 7, further comprising:
receiving a command different from the read command from the host; and
storing the different command in the command queue.

11. The control method of claim 7, further comprising:
in response to the first chip receiving a priority command for designating a command that is preferentially to be executed from the host, executing the command stored in the command queue and preferentially executed in response to the received priority command.

12. The control method of claim 7, wherein a plurality of planes that are parallel operation elements are defined in each of the second chips and the third chips, the method further comprising transmitting information obtained by editing a status of each plane to the host.

13. A semiconductor device comprising:
a first chip having a terminal to which a signal from a host is configured to be input;
a second chip group having a plurality of second chips electrically connected to the first chip; and
a third chip group having a plurality of third chips electrically connected to the first chip in parallel with the second chip group, wherein
the first chip includes:
a command queue configured to store a plurality of read commands received from the host; and
a read buffer memory configured to buffer read data read from the second chip group or the third chip group; and
the first chip is configured to:
check a read operation status of the second or third chip group,
issue the plurality of read commands stored in the command queue from the command queue with priority to the second or third chip group that is not performing the read operation,
store, in the read buffer memory, the read data retrieved from the second chip group or the third chip group in response to issuance, by the first chip, of the plurality of read commands to the second chip group or the third chip group; and
transmit any read data among the read data stored in the read buffer memory to the host based on an execution status of any read command among the plurality of read commands issued to the second chip group or the third chip group, wherein
the first chip is configured to:
store a part of read data corresponding to a first read command among the plurality of read commands from the second chip group or the third chip group, in the read buffer memory; and
store remaining read data corresponding to the first read command from the second chip group or the third chip group based on an execution status of a second read command other than the first read command, in the read buffer memory.

14. The semiconductor device according to claim 13, wherein
an execution order of the plurality of read commands stored in the command queue is variable.

15. The semiconductor device according to claim 13, wherein
the first chip further includes a write buffer memory,
the first chip is configured to receive a write command from the host, store write data related to the write command in the write buffer memory, and write the stored write data to the second chip group or the third chip group.

16. The semiconductor device according to claim 13, wherein
the first chip is configured to receive a command different from the read command from the host, and further store the different command in the command queue.

17. The semiconductor device according to claim 13, wherein
when the first chip receives a priority command for designating a command that is preferentially to be executed from the host, the first chip is configured to execute the command stored in the command queue and preferentially to be executed in response to the received priority command.

18. The semiconductor device according to claim 13, wherein
a plurality of planes that are parallel operation elements are defined in each of the second chips and the third chips, and
the first chip is configured to transmit information obtained by editing a status of each plane to the host.

* * * * *